July 7, 1959    N. IEROKOMOS    2,893,130
MICROMETER DEPTH GAUGE
Filed May 20, 1957    2 Sheets-Sheet 1

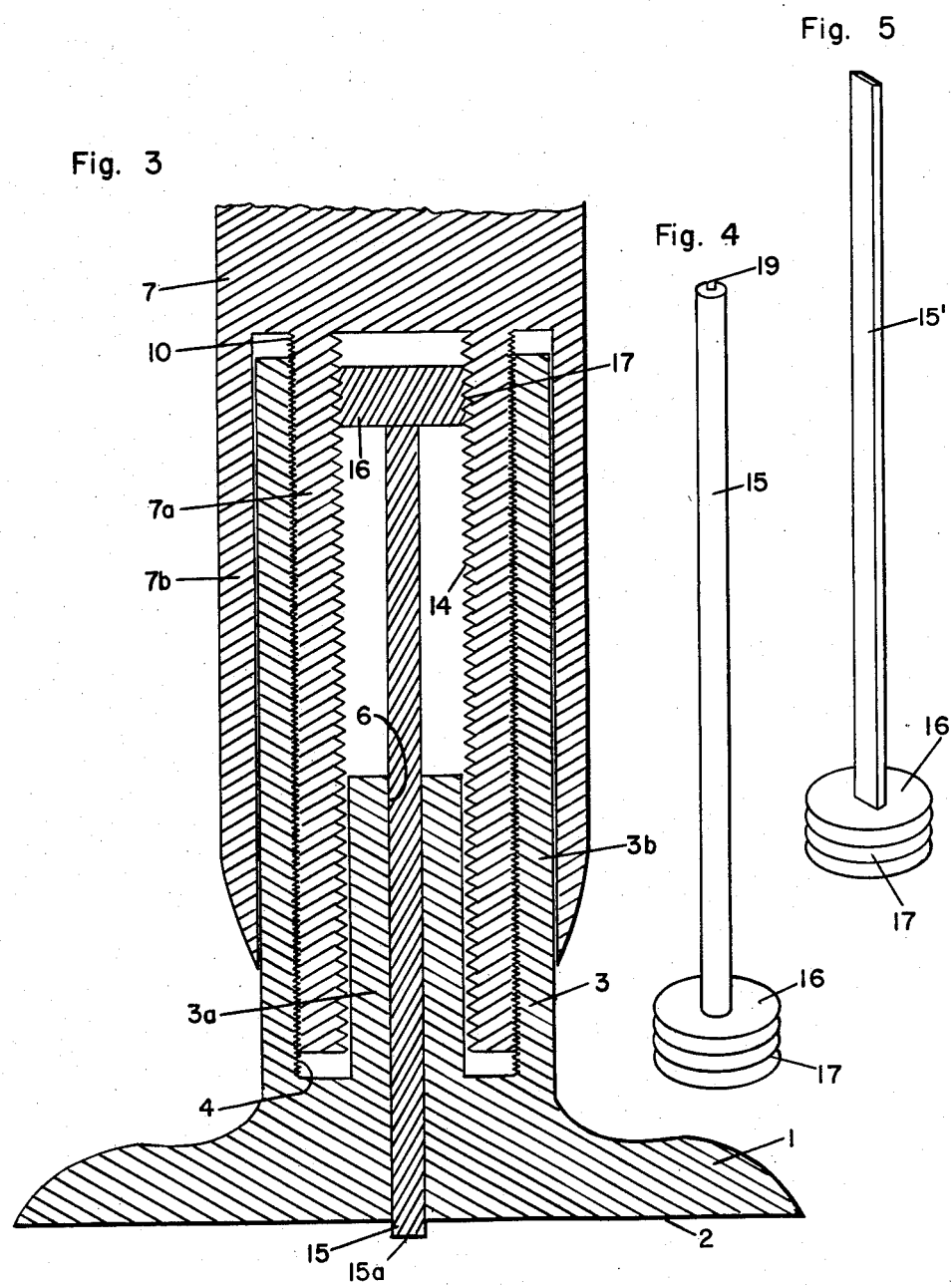

United States Patent Office 2,893,130
Patented July 7, 1959

2,893,130

MICROMETER DEPTH GAUGE

Nikiforos Ierokomos, Brooklyn, N.Y.

Application May 20, 1957, Serial No. 660,146

6 Claims. (Cl. 33—170)

The present invention relates to micrometer depth gauges.

A micrometer depth gauge customarily consists of a base, a sleeve or barrel projecting from the base and a rotatable thimble that screws onto the barrel. The thimble carries a spindle or rod which extends axially of the barrel and projects down through an axial aperture in the base. As the thimble is screwed downwardly on the barrel, the rod projects an increasing distance from the base. A scale is customarily provided on the outside of the barrel. The zero end of the scale is the end farthest from the base while the high end is the end nearest the base. Hence the scale is progressively covered by the thimble as the thimble is screwed downwardly toward the base. This means that when the depth gauge is set for its highest reading, the scale is completely obscured by the barrel. Moreover, when the lower edge of the barrel is at a point intermediate two units on the scale the lower unit is obscured by the barrel. For example, if the reading is .215 inch, the "2" is obscured and in order to make the reading, it is necessary to refer back from the "3." This backwards arrangement of the scale makes the depth gauge more difficult to read.

It is an object of the present invention to provide a direct reading micrometer depth gauge with the scale so arranged that when the depth gauge is at an intermediate position, the lower portion of the scale is visible. With this arrangement the setting can be read directly and is not necessary to interpolate back from the next higher unit on the scale. Moreover, as the depth read by the gauge increases, the amount of the scale visible progressively increases. This provides a natural relationship which makes the depth gauge easier and faster to use.

A further advantage of the depth gauge in accordance with the invention is that the spindle does not rotate. It is hence possible to measure a narrow ledge or shoulder without danger of the spindle skidding off. In a preferred embodiment of the invention, the spindle is flat and since it does not turn it will pass into a narrow slot to measure the depth of the slot.

Other objects and advantages of the invention will appear from the following description and claims in conjunction with the accompanying drawings which show preferred embodiments of the invention and in which:

Fig. 3 is an enlarged and somewhat simplified axial section of the lower portion of the depth gauge.

Fig. 4 is an inverted perspective view of the spindle and

Fig. 5 is a view similar to Fig. 4 but showing another form of spindle.

Figure 1:
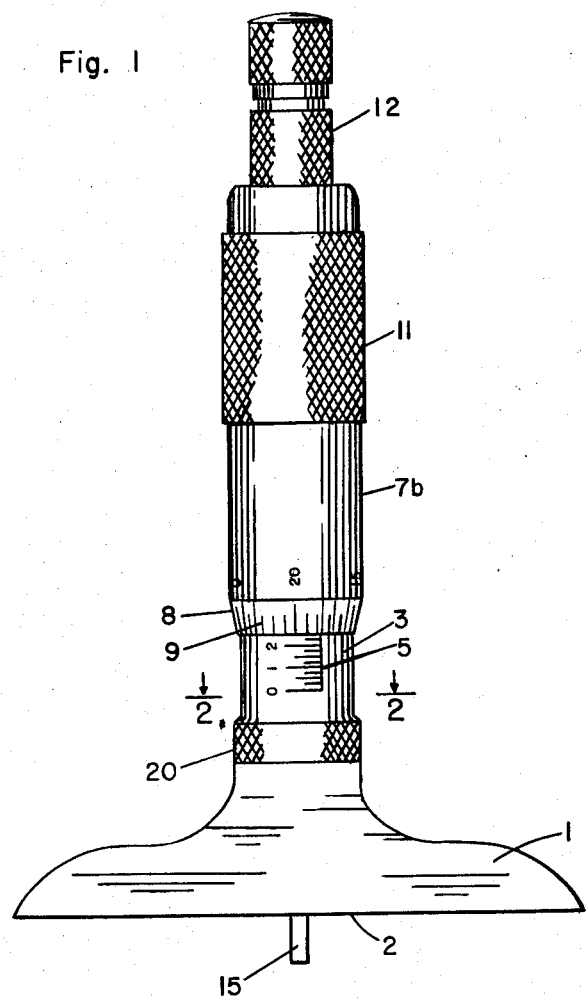
Fig. 1 is a side elevation of a micrometer depth gauge in accordance with the invention.

As illustrated in the drawings, the micrometer depth gauge comprises a base portion 1 having an accurate flat face 2 adapted to seat on an appropriate surface of a workpiece having a hole, recess or other depression, the depth of which is to be measured. The lower face 2 of the base 1 thus provides an accurate reference surface. A sleeve or barrel 3 projects upwardly from the base in a direction away from the face 2 and is fixed relative to the base. Preferably the base and barrel are formed integral with one another as illustrated in Fig. 3. The barrel comprises an inner barrel 3a and an outer barrel 3b which in concentric with and spaced from the inner barrel so as to provide an annular space between them. The outer barrel is substantially longer than the inner barrel so as to project upwardly beyond the upper end of the inner barrel. The inner surface of the outer barrel 3b is threaded to provide helical threads 4 which preferably extend substantially the entire length of the inner surface of the outer barrel. On the outside of the outer barrel, there is preferably provided a scale 5 which extends lengthwise of the barrel. The lower or zero end of the scale is nearest the base 1. The scale thus increases numerically in a direction away from the base. The inner barrel 3a has an axial bore or aperture 6 which extends down through the base 1 and opens in approximately the center of the lower face 2.

A thimble 7 is coaxial with and rotatable on the barrel 3. The thimble has a hollow cylindrical inner portion 7a and a concentric outer portion 7b which is spaced from the inner portion so as to provide an annular space between them. The outer portion 7b of the thimble surrounds the outer portion 3b of the barrel and has an inside diameter slightly greater than the outside diameter of the barrel so as to fit snugly on the barrel but be freely rotatable and also movable in an axial direction. The lower end of the outer portion 7b of the thimble is preferably beveled as indicated at 8 and calibrated to provide a scale 9 which cooperates with the scale 5 on the barrel to read the setting of the depth gauge.

The inner portion 7a of the thimble is threaded externally to provide helical threads 10 which match the threads 4 of the barrel. The outer diameter of the inner thimble portion 7a is such that this portion screws into the internally threaded outer portion 3b of the barrel. Hence by rotating the thimble it can be screwed farther into or out of the barrel and thus moved axially relative to the barrel and to the base 1. The threads 4 and 10 are preferably right hand threads so that the thimble is screwed downwardly when turned in a clockwise direction as viewed from the top. An outer surface 11 of the thimble is perferably knurled to facilitate rotation of the thimble. At its upper end, the thimble is preferably provided with a knurled knob 12 which is of smaller diameter and is connected to the thimble by spring ratchet means in known manner so that a selected torque can be applied to the thimble by turning the knob 12 to obtain more accurate measurements. As such ratchet means are well known, it is not shown in the drawings.

The inner portion 7a of the thimble has an internally threaded axial bore 14 having an internal diameter slightly larger than the outside diameter of the inner barrel portion 3a. The lower part of the inner thimble portion 7a is thus accommodated in the angular space between the inner and outer portions of the barrel 3 when the thimble is in a lower position. The threads of the bore 14 are of the same direction but have a pitch that is greater than that of the interengaging threads 4 and 10 of the barrel and thimble and is preferably twice as great. The bore 14 is preferably threaded throughout substantially its entire length.

Figure 2:
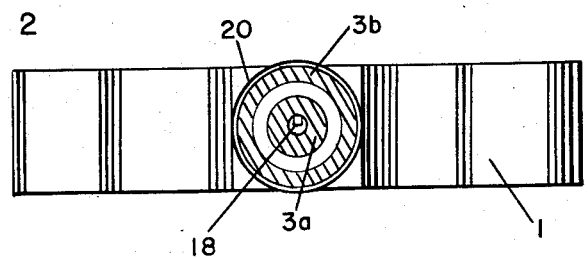
Fig. 2 is a cross section taken approximately on the line 2—2 in Fig. 1.

An axially disposed rod or spindle 15 extends through the axial bore 6 of the barrel and base. The spindle 15 is provided at its upper or inner end with an enlarged head portion 16 which is externally threaded to provide threads 17 mating with the threads of the internally threaded bore 14 of the thimble. The spindle is preferably of such length that its lower end 15a is flush with the lower face 2 of the base 1 when the head portion 16 is near the upper end of the bore 14. Means is provided for holding the spindle against rotation relative to the barrel and base. As illustrated in Figs. 2 and 4, the means for holding the spindle against rotation comprises a key 18 which is provided in the bore 6 of the base and engages in a longitudinally extending key slot 19 provided in the spindle 15 (Fig. 4). Alternatively the spindle can be of non-circular cross section for example flat as illustrated by the spindle 15' in Fig. 5, it being understood that at least a portion of the bore 6 is of like shape so as to hold the spindle against rotation, while permitting it to slide in an axial direction.

Preferably, the depth gauge is provided in known manner with a lock nut 20 (Fig. 1) which can be tightened to hold the depth gauge at a selected setting. As lock nuts of this kind are known, it is not shown in detail in the drawings and is omitted from Fig. 3 for the sake of simplicity.

When the depth gauge is at zero setting, the lower beveled edge 8 of the thimble is at the zero mark of the scale 5, the lower end 15a of the spindle is flush with the lower face 2 of the base and the head portion 16 of the spindle is at or near the upper inner end of the threaded bore 14 in the inner portion 7a of the thimble. If the thimble is then rotated in a counterclockwise direction as viewed from above, it will be screwed upwardly on the barrel and thus progressively uncover the scale 5. As the thimble moves upwardly, the spindle 15 moves downwardly by reason of the pitch of the threads 17 being greater than that of threads 4 and 10. Assuming that the pitch is twice as great, the spindle moves downwardly relative to the lower face 2 of the base at the same rate that the thimble moves upwardly. Hence as the thimble moves progressively upward, the spindle moves downwardly and projects a progressively increasing distance beyond the face 2. By reason of the thimble and spindle moving in opposite directions, the scale 5 is progressively uncovered and the lower end portion of the scale is visible when the thimble is in an intermediate position. For example in the position shown in Fig. 1, the thimble is a fraction above the "2" mark so that the base number "2" and the fraction can be easily read. The depth gauge operates in a natural manner since the portion of the scale that is visible is equal or proportional to the depth of the spindle projects beyond the reference face 2. While for most purposes it is desirable for the pitch of the thread 17 to be twice that of threads 4 and 10 so that the thimble and spindle move in opposite directions but at the same rate, the pitch ratio may be varied for special purposes. Thus, for example, by selection of a suitable ratio, the spindle can be made to move at only half the rate of the thimble so as to obtain a still more accurate measurement.

While preferred embodiments of the invention have been shown and particularly described, it will be understood that the invention is in no way limited to these embodiments but may be varied within the scope of the appended claims.

What I claim and desire to secure by Letters Patent is:

1. A micrometer depth gauge comprising a base, a fixed cylindrical threaded sleeve extending from said base, said base having an aperture extending axially of said sleeve, a hollow thimble rotatable on said sleeve and having threads engaging the threads of said sleeve whereby the thimble is movable axially of said sleeve by rotation of the thimble relative to the sleeve, said thimble having a threaded bore, a slender spindle extending through said aperture in the base and having at its upper end an enlarged threaded head engaging the threads of said bore and means holding said spindle from rotation relative to the base while permitting relative axial sliding movement, the threads of said bore and head having a pitch twice that of the threads of said sleeve so that when the thimble is screwed upwardly away from the base said spindle moves downwardly at the same rate and an end portion of the spindle projects beyond the base.

2. A micrometer depth gauge comprising a base, a fixed cylindrical barrel extending from said base, said barrel having a smooth cylindrical exterior surface and a threaded axial bore, said base having an aperture in axial alignment with said bore, a thimble having a cylindrical skirt portion surrounding the barrel and a cylindrical inner portion that is externally threaded and screws into said threaded axial bore of the barrel, said inner portion of the thimble having an axial bore which is internally threaded with a pitch twice that of the threaded axial bore of said barrel, a slender spindle extending through said aperture and having at its upper end an enlarged threaded head screwed into the threaded bore of said thimble and means holding the spindle from rotation relative to the base while permitting relative axial sliding movement, said spindle being moved downwardly when the thimble is screwed upwardly away from the base by reason of said difference in thread pitch.

3. A depth gauge according to claim 2, in which at least the lower end portion of the spindle is rectangular in cross section.

4. A micrometer depth gauge comprising a base having an accurate flat lower face, an outer barrel extending upwardly from said base, said barrel having a smooth cylindrical outer surface and an internally threaded axial bore, said outer surface of the barrel having thereon a scale having a zero index nearest said base and increasing in a direction away from said base, an inner barrel coaxial with said outer barrel and spaced inwardly thereof to provide an annular space between said inner and outer barrels, said inner barrel being shorter than said outer barrel and having an axial bore which extends through said base, a thimble having a hollow cylindrical inner portion and a coaxial hollow cylindrical outer portion, said outer thimble portion fitting closely around said outer barrel and terminating at its lower end in a calibrated beveled edge, said inner thimble portion being received in said annular space and having external threads engaging said threaded bore of the outer barrel, said inner thimble portion having an axial bore which is internally threaded with a pitch greater than that of said external threads, a slender spindle extending through the axial bore of said inner barrel and having at its upper end an enlarged head having external threads mating with the internal threads of said inner thimble portion, said spindle and bore of said inner barrel having interengaging surfaces holding said spindle against rotation while permitting its axial movement, said spindle being movable downwardly at a corresponding rate as said thimble is screwed upwardly on said barrel to uncover said scale progressively.

5. A depth gauge according to claim 4, in which said spindle is of rectangular cross section.

6. A depth gauge according to claim 4, in which the pitch of the internal threads of said inner thimble portion is twice that of said external threads of said inner thimble portion.

References Cited in the file of this patent

UNITED STATES PATENTS

| | | |
|---|---|---|
| 1,922,758 | Christopherson | Aug. 15, 1933 |
| 2,338,271 | Ulanet | Jan. 4, 1944 |
| 2,704,403 | Sawijalow | Mar. 22, 1955 |

FOREIGN PATENTS

| | | |
|---|---|---|
| 8,798 | Great Britain | Apr. 12, 1906 |